Sept. 2, 1947. R. A. KARTYSHAI 2,426,883
COMBINATION CONTAINER FOR FACE POWDER AND OTHER MAKE UP ITEMS
Filed Aug. 8, 1944 3 Sheets-Sheet 1
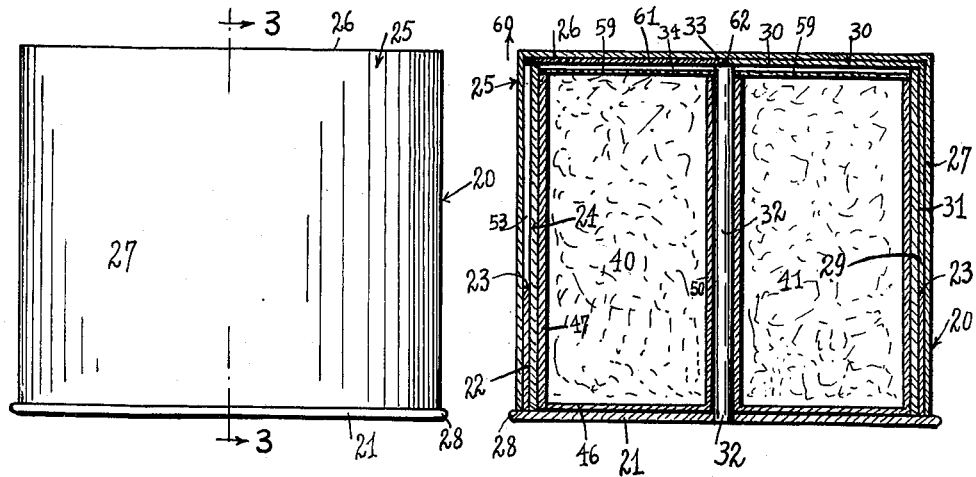
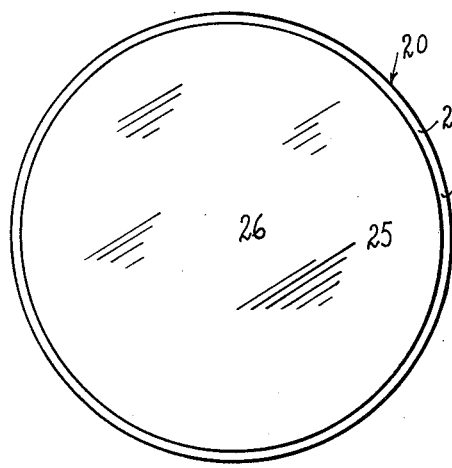
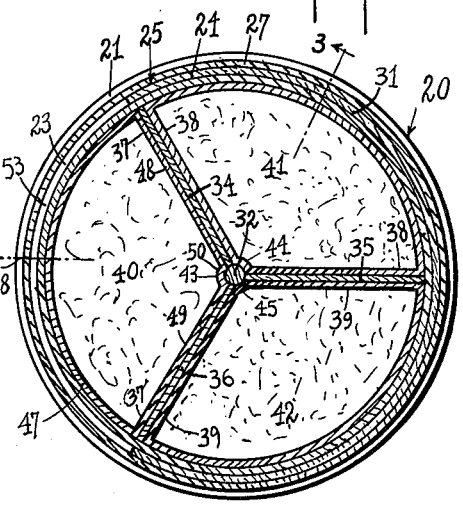
ROBERT A. KARTYSHAI,
INVENTOR.
BY: Julian J. Wittal,
his attorney.

Sept. 2, 1947. R. A. KARTYSHAI 2,426,883
COMBINATION CONTAINER FOR FACE POWDER AND OTHER MAKE UP ITEMS
Filed Aug. 8, 1944 3 Sheets-Sheet 2

ROBERT A. KARTYSHAI,
INVENTOR.
BY: *Julian J. Wittal*
his attorney.

Sept. 2, 1947. R. A. KARTYSHAI 2,426,883
COMBINATION CONTAINER FOR FACE POWDER AND OTHER MAKE UP ITEMS
Filed Aug. 8, 1944 3 Sheets-Sheet 3
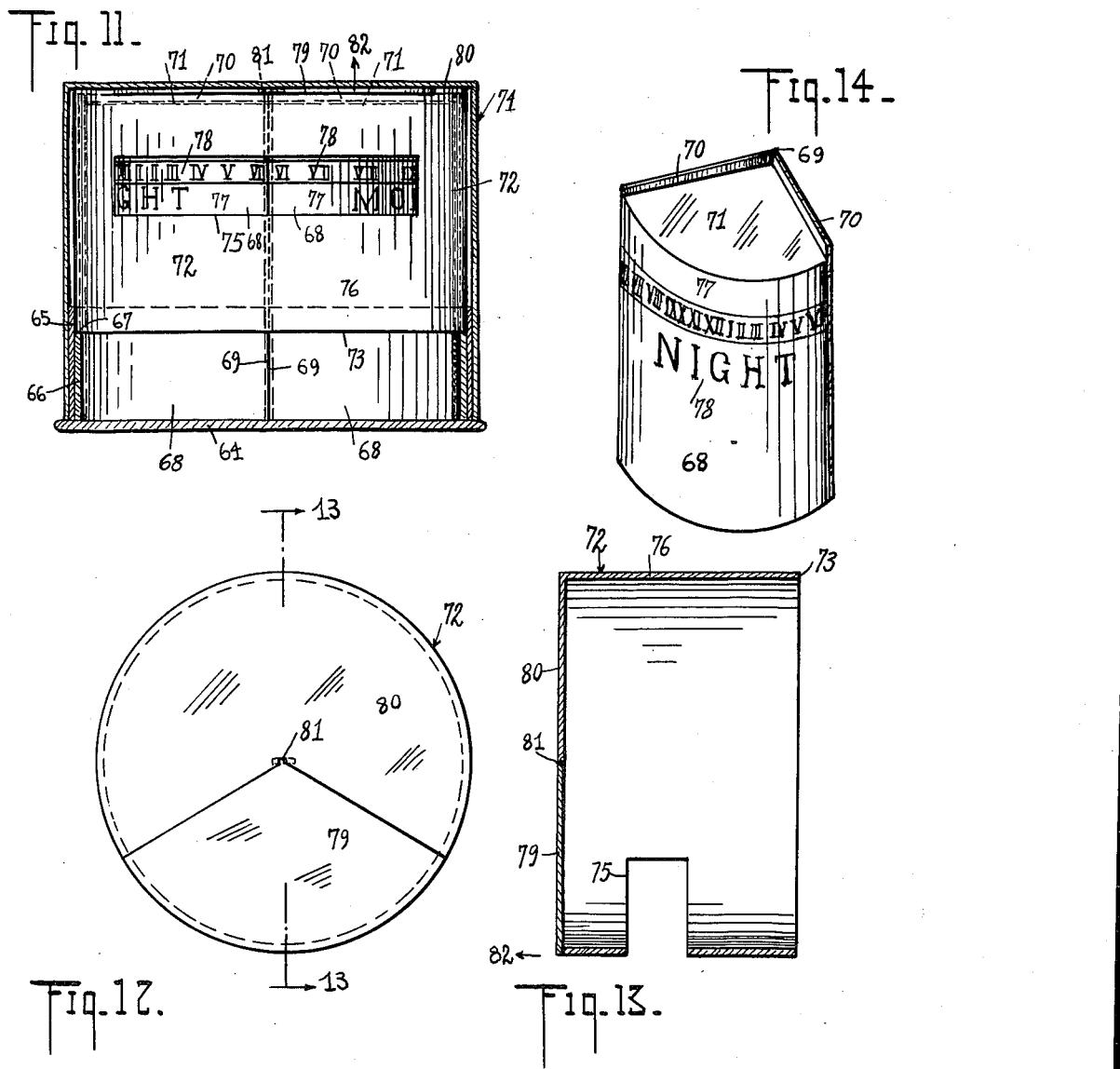
ROBERT A. KARTYSHAI,
INVENTOR.
BY: Julian J. Wittal
his attorney.

Patented Sept. 2, 1947

2,426,883

UNITED STATES PATENT OFFICE 2,426,883

COMBINATION CONTAINER FOR FACE POWDER AND OTHER MAKE-UP ITEMS

Robert A. Kartyshai, New York, N. Y.

Application August 8, 1944, Serial No. 548,522

6 Claims. (Cl. 132—79)

This invention relates to cosmetics, particularly face powder, and has for its main object to provide in a single unit several compartments for different colors of face-powder or any other make-up items, which will enable the individual color-type user, to solve the problem of light and color in make-up and in relation to respective parts of the day.

To simplify its usage, the day for my invention preferably, is divided into three sections representing three variations of color and light. The first part of day from 6 a. m. to 12 noon, designated as "Morn," provides a specific color for that part of the day. The second part of day from 12 noon to 6 p. m., designated as "Noon," provides a different color. The third part of the 24 hour day from 6 p. m. to 6 a. m. designated as "Night," provides a third appropriate color.

All three colors are defined by special indicia in relation to a specific type, such as: bright red hair, pink or freckled skin, blue or green eyes, in the latter case is designated in a system of indicia as "chroma-type J," and "J-1" for "Morn," "J-2" for "Noon," and "J-3" for "Night."

Another object of my invention is to provide three or more color combinations with a possibility for blending two or more colors, to achieve a different color from any of the three provided in my device, but still adapted to the "chroma-type" in question.

Still a further object of my invention is to provide a container for face-powders or other cosmetics, wherein said various colors and combinations may be efficiently housed and made available.

Other objects of my invention will be apparent as the specification of the same will proceed, and, among others I may mention: to provide a combination container for face-powders or other cosmetic items as characterized hereinbefore, which will be comparatively simple in construction, inexpensive to manufacture and easy and reliable in use and operation.

In the drawings, forming a part of this specification and accompanying the same:

Fig. 1 is an elevational view of my assembled powder box in a closed position;

Fig. 2 is a plan view thereof;

Fig. 3 is a vertical sectional view, the section being taken on the line 3—3 of Figs. 1 and 4;

Fig. 4 is a horizontal sectional view;

Fig. 5 is a perspective view of a sectional powder container, several of which are used in my device;

Figure 8:
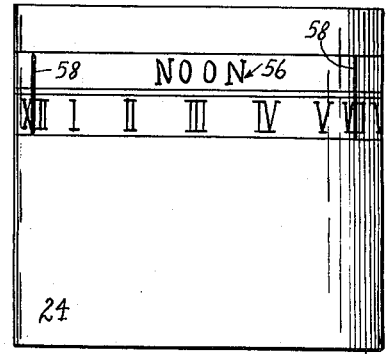
Figure 9:
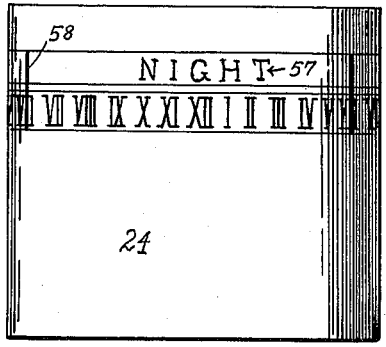
Figure 10:
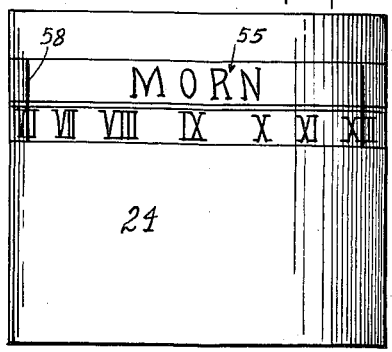

Figs. 8, 9, and 10 show three sides of said hollow cylinder indicating the parts and hours of a part of the day;

Fig. 11 is a sectional view of an assembled powder box made according to a modified form of my invention;

Figs. 12 and 13 are plan and sectional views, respectively, of a rotating member used in said modification of my invention;

Fig. 14 is a perspective view of a sectional powder container used in said modification of my device.

Referring now to the drawings more in detail, by characters of reference, the numeral 20 indicates the first embodiment of my invention, in general, and it is composed of a multiple of hollow cylindrical members forming a box of this shape.

The numeral 21 indicates the base or bottom of the main supporting element of my structure having a short up-standing circular wall 22 terminating as at 23.

To the inside of said short wall 22 is secured a hollow cylindrical or tubular member 24 which carries around its upper surface the indications shown in Figs. 6, 8, 9, and 10. A usual cover or cap generally indicated by the numeral 25, is employed to close the device, having the top 26, and the circular side wall 27 by which it may slide over the short wall 22, as indicated in Fig. 3, and as it is usual with such boxes, resting on the projecting flange 28 of the bottom 21.

Resting by its lower end on the terminal 23 of the short wall 22 is a second inner cap, generally indicated by the numeral 29, having a top 30 and downward circular wall 31. This inner cap 29 is rotatable, as will be more fully explained hereinafter.

An upstanding central post or pin 32 is secured into the bottom 21, on the top 33 of which said rotatable inner cap 29 my also rest.

Three segmental walls, 34, 35, and 36 are secured to the central post 32, at their inner ends, and to the sleeve 24, with their outer ends, thereby forming three compartments, designated by the numerals 37, 38, and 39 respectively.

Into each compartment fits a sectional powder container, generally having the cross section of a section of a circle, with the exception that their inner ends are rounded to fit to the central post 32.

The three sectional containers, generally are indicated by the numerals 40, 41 and 42 respectively, and their rounded inner ends by the numerals 43, 44 and 45.

Each container is composed of a bottom wall 46, an outer wall 47, being a portion of a tube, two radial side walls 48 and 49, and an inner smaller rounded wall 50, to fit the central post 32.

Figure 6:
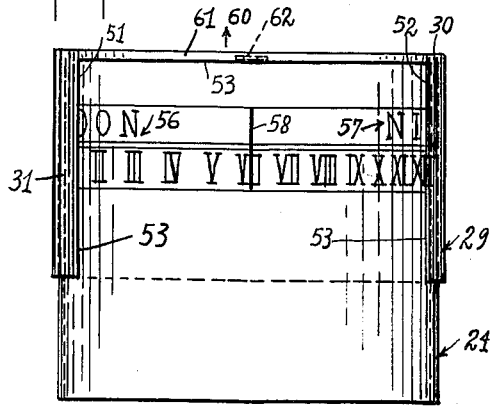
Fig. 6 is an elevational view of a rotatable member in my device, and a stationary, hollow cylinder carrying designations, around which said first member rotates.
Figure 7:
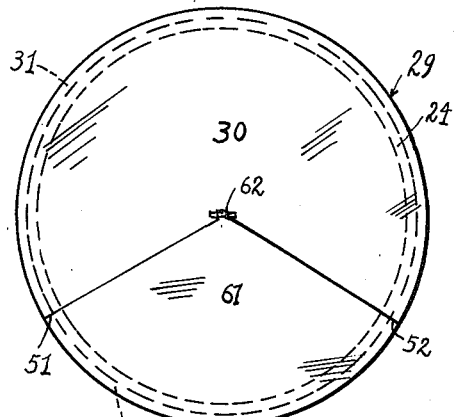
Fig. 7 is a plan view of the sub-assembly shown in Fig. 6.

The rotatable inner cap 29 is shown more in detail in Figs. 6 and 7, and it will be seen that a portion of its tubular side wall 31 is cut away to the limits 51 and 52, thereby forming a window 53 in its wall, said window generally being about as wide as will correspond to the outer widths of the sectional containers 40, 41 and 42, or the outer width of said window being one third of the circumference of the stationary indicator tube 24, on which said cap 29 will rotate.

Around the upper portion of its outer surface, the stationary indicator tube 24 will carry the hours from 6 a. m. to the following 6 a. m., said hours being divided into three parts, the hours from 6 to 12 a. m. being indicated by the word "Morn" as at 55, those between noon and 6 p. m. being indicated by the word "Noon" as at 56, and the hours between 6 p. m. and 6 a. m. being indicated by the word "Night" as at 57.

Conspicuous vertical limit lines 58 may also be employed to show the limits of said parts of the day.

Each sectional container 40, 41 and 42 will have a different color-type of face powder in it, and normally the top of each section will be closed by an appropriate thin layer 59, preferably of transparent material, like Cellophane.

The use, and operation of my device will be apparent from the herein description.

As has been described hereinbefore, three sectional powder containers 40, 41 and 42, are placed in the respective partitioned spaces 37, 38, and 39 of my powder box. Each of the three sectional compartments has a color-type face powder therein adapted to a particular type of person and for Morn, Noon, and Night, respectively.

In Fig. 5, one of such sectional containers is illustrated and for the "J" chroma-type by my system of designation and being for the bright red hair, blue or green eyes, and pink or freckled skin type and the container there illustrated is designated as "J-3," that is, for the hours of Night, the other compartments of my device will then be for powder colors "J-1" for Morn, and "J-2" for Noon respectively.

On the stationary sleeve 24 are shown corresponding designations Morn, Noon and Night, with their hours, as in Figs. 8, 9, and 10, and to the rear of those, the respective sectional containers 40, 41, and 42 will be placed into the compartments designated on the sleeve 24 for the various parts of the day according to the contents of the sectional container.

The thin cover or seal 59 of each container will be broken or removed and if it is desired to use a certain color powder for the respective part of the day, the cap 29 will be rotated until its window or cut away part 53 will uncover the respective designation on the stationary sleeve 24, whereupon the color powder in said sectional container may be used.

It is to be noted that from the top 30 of the rotating cap 29 a section 61 is separated, right above its window 53 and corresponding to the top of one sectional compartment of my device.

Section 61 is hingedly connected to the rest of the top, as at 62, and when it is desired to use the powder in any of the sectional containers of my device, after the window 53 has been turned to said compartment, the section 61 will be lifted upwardly on its hinge 62 thereby giving access, to the color powder in the respective compartments. (Arrow 60.)

The partition walls 34, 35, and 36, are somewhat higher than the sectional containers 40, 41, and 42, to prevent a spilling over of the powder from one compartment into the other. The various parts of my device, generally may be made, in shape and dimension, fitting to one another as closely as possible, but, on the other hand, appropriate small play may be allowed between them to permit easy rotating and other movements, and still keep the powder container sealed when closed, according to the prevailing method.

When a color powder has been used up in any of the compartments, the respective sectional container 40, 41, and 42, now empty, may be discarded and replaced by a new one. For easier replacement the individual sectional containers will be marked for the respective types and parts of the day, as indicated at 63 in Fig. 5.

It will be seen that not only do I provide a specific, novel, highly efficient combination face powder or cosmetic container but I also provide efficient means to replace the kind of powder or cosmetics which have been used up so that the user may secure for the first time a container that need not be discarded when empty and for which refills in powder or cosmetics may be purchased for any of the sectional containers. Such replacement sectional containers may be manufactured and sold individually, designated by my said indicia, shown in Fig. 5.

In Figs. 11 to 14 I illustrate a modified embodiment of my invention.

In this modification the base or bottom for my powder box is indicated by the numeral 64, and it has a short upstanding wall 65 on the inside of which is a still shorter wall or base 66 terminating as at 67.

The individual sectional containers are illustrated in Fig. 14 generally indicated by the numeral 68, and they will be placed inside of the short wall or ledge 66, as indicated in Fig. 11, in a similar circular arrangement, as has been shown with the first modification of my invention described hereinbefore.

In this embodiment, however, I may omit the central post or pin 32, and the inner edges 69 of the sectional container 68 may directly meet in the center of my device.

Each sectional container 68 will have side walls 70 slightly higher than its closure or top 71.

A rotatable cap 72 separately shown in Figs. 12 and 13, may rest on the upper end 67, of the ledge 66, by its lower end 73, and will be rotatable thereon within the outer confining wall 65.

The individual sections 68 are enclosed by said cap 72, as will be seen.

Finally a closure cap 74 may be employed, as usual for such boxes, and as has been described in connection with the first embodiment of my invention.

A window 75 is cut into the side wall 76 of the rotating cap 72 said window having a length sufficient to uncover the full outer widths 77 of a sectional container 68.

On the outer surface 77 of each sectional container will be the respective indicia 78 for Morn, Noon or Night and for the hours as described hereinbefore.

It will be obvious that as the cap 72 is rotated it will uncover the various sectional containers and from the indicia read it can be established which one should be used. When the window 75 arrives to the desired container, the section 79, separated from the top 80 of the rotating cap 72, and from its side walls 76, may be thrown open on its hinge 81, (arrow 82) and thereby access provided to the color powder or cosmetic in the respective container.

The side walls 70 of the sectional containers 68 are made higher than their tops 71 here also for the purpose of preventing a spilling over of the powder from one container into the next one.

From the foregoing description, taken in connection with the drawings accompanying the same, and from the remarks and explanations offered, the advantages and methods of construction, use and operation of my invention will be readily understood by those versed in the art to which my invention appertains, and while I have described the devices which I now consider to be the best embodiments thereof, I desire to have it understood that they are shown as merely illustrative and not limiting, and that such changes may be made when desired, as are within the spirit of this specification and the scope of the claims hereunto appended.

So, for instance while I describe my invention mainly as applied to face powders, it will be understood that the principles and various embodiments or parts thereof, may be used for other cosmetics or make-up items, which I reserve my rights to such other uses.

What I claim as new is:

1. A combination box for face powder, or the like, comprising a circular casing open at the top, a plurality of subcontainers in the form of radial segments of a cylinder, in said casing, arranged circularly in a side by side relation, a different face powder in each subcontainer, a rotatable cap enclosing said subcontainers said cap having a window adapted to successively give access to one subcontainer at a time upon the rotation of the cap, said subcontainers being open at the top and said window extending through the top of the cap in the form of a segment thereof corresponding to the top of a subcontainer, a stationary tube in said casing open at the top between said cap and said subcontainers, a hinged lid in said segmental window in the top of the cap normally closed but adapted to be thrown open to uncover a desired subcontainer, said cap having a second window in its side wall, indicia on said tube to indicate the parts of the day for which the color powders in the respective containers to the rear of the indicia are to be used, said indicia being successively uncovered by said second window at the same time as said first window will give access to the contents.

2. A combination box for face powder, or the like, comprising a circular casing open at the top, a plurality of subcontainers in the form of radial segments of a cylinder, in said casing, arranged circularly in a side by side relation, a different face powder in each subcontainer, a rotatable cap enclosing said subcontainers, said cap having a window adapted to successively give access to one subcontainer at a time upon the rotation of the cap, said subcontainers being open at the top and said window extending through the top of the cap in the form of a segment thereof corresponding to the top of a subcontainer, a stationary tube in said casing open at the top between said cap and said subcontainers, a hinged lid in said segmental window in the top of the cap normally closed but adapted to be thrown open to uncover a desired subcontainer, said cap having a second window in its side wall, indicia on said tube to indicate the parts of the day for which the color powders in the respective containers to the rear of the indicia are to be used, said indicia being successively uncovered by said second window at the same time as said first window will give access to the contents, a central post in said casing, and partition walls between said subcontainers connecting said post to said tube and forming compartments for said subcontainers.

3. A combination box for face powder, or the like, comprising a circular casing open at the top, a plurality of subcontainers in the form of radial segments of a cylinder, in said casing, arranged circularly in a side by side relation, a different face powder in each subcontainer, a rotatable cap enclosing said subcontainers, said cap having a window adapted to successively give access to one subcontainer at a time upon the rotation of the cap, said subcontainers being open at the top and said window extending through the top of the cap in the form of a segment thereof corresponding to the top of a subcontainer, a stationary tube in said casing open at the top between said cap and said subcontainers, a hinged lid in said segmental window in the top of the cap normally closed but adapted to be thrown open to uncover a desired subcontainer, said cap having a second window in its side wall, indicia on said tube to indicate the parts of the day for which the color powders in the respective containers to the rear of the indicia are to be used, said indicia being successively uncovered by said second window at the same time as said first window will give access to the contents, and diagonal partition walls between said subcontainers secured into said stationary tube.

4. In a device, as set forth in claim 3, said walls being higher than the top of said subcontainer to prevent spilling of the contents of one subcontainer into the other.

5. A combination box for face powder, or the like, comprising a circular casing open at the top, a plurality of subcontainers in the form of radial segments of a cylinder, in said casing, arranged circularly in a side by side relation, a different face powder in each subcontainer, a rotatable cap enclosing said subcontainers, said cap having a window adapted to successively give access to one subcontainer at a time upon the rotation of the cap, normally concealed indicia on said subcontainers to show the part of the day to which the respective color face powder is intended, said window uncovering the indicia at the same time as giving access to the respective subcontainer, said subcontainers being open at the top and said window extending through the top of the cap in the form of a segment thereof corresponding to the top of a subcontainer.

6. A combination box for face powder, or the like, comprising a circular casing open at the top, a plurality of subcontainers in the form of radial segments of a cylinder, in said casing, arranged circularly in a side by side relation, a different face powder in each subcontainer, a rotatable cap enclosing said subcontainers, said cap having a window adapted to successively give access to one subcontainer at a time upon the rotation of the cap, said subcontainers being open at the top and said window extending through the top of the cap in the form of a segment thereof corresponding to the top of a subcontainer, said subcontainers normally having a breakable top, and side walls higher than said breakable top to prevent the spilling over of the contents from one container into the other.

ROBERT A. KARTYSHAI.

REFERENCES CITED

The following references are of record in the file of this patent:

UNITED STATES PATENTS

| Number | Name | Date |
|---|---|---|
| 1,821,741 | Dalton | Sept. 1, 1931 |
| 2,035,356 | White et al. | Mar. 24, 1936 |
| 83,695 | Crane | Nov. 3, 1868 |
| 2,129,150 | Pekrol | Sept. 6, 1938 |
| 2,351,815 | Jensen | June 20, 1944 |

FOREIGN PATENTS

| Number | Country | Date |
|---|---|---|
| 40,191 | Sweden | Nov. 9, 1914 |